United States Patent [19]

Hihara et al.

[11] Patent Number: 5,244,485
[45] Date of Patent: Sep. 14, 1993

[54] METHOD OF MANUFACTURING A SILICA GLASS PREFORM

[75] Inventors: Hiroshi Hihara; Masato Oku; Takeshi Yagi; Noritsugu Enomoto; Tsuguo Sato; Kazuaki Yoshida; Takayuki Morikawa, all of Tokyo, Japan

[73] Assignee: The Furukawa Electric Co., Ltd., Tokyo, Japan

[21] Appl. No.: 874,179

[22] Filed: Apr. 24, 1992

[30] Foreign Application Priority Data

| Apr. 30, 1991 | [JP] | Japan | 3-126722 |
| Apr. 30, 1991 | [JP] | Japan | 3-126723 |
| Jul. 31, 1991 | [JP] | Japan | 3-191521 |
| Jul. 31, 1991 | [JP] | Japan | 3-214366 |
| Sep. 6, 1991 | [JP] | Japan | 3-254224 |

[51] Int. Cl.$^5$ .............................. C03B 37/075
[52] U.S. Cl. .............................. 65/3.11; 65/2; 65/3.12; 65/18.1; 65/18.3
[58] Field of Search .............. 65/2, 3.11, 18.1, 18.3, 65/3.12

[56] References Cited

U.S. PATENT DOCUMENTS

| 4,620,862 | 11/1986 | Dorn et al. | 65/18.1 |
| 4,775,401 | 10/1988 | Fleming et al. | 65/3.11 |
| 4,786,304 | 11/1988 | Chen | 65/18.1 |
| 5,185,020 | 2/1993 | Satoh et al. | 65/3.11 |

FOREIGN PATENT DOCUMENTS

| 53-48536 | 5/1978 | Japan. |
| 61-256937 | 11/1986 | Japan. |
| 63-55132 | 3/1988 | Japan. |

Primary Examiner—Robert L. Lindsay
Attorney, Agent, or Firm—Frishauf, Holtz, Goodman & Woodward

[57] ABSTRACT

The method of manufacturing a silica glass preform comprises the steps of inserting a rod-like member mainly containing a ductile material, into a forming space of a mold, charging the remaining space of the forming space with a forming material containing silica glass powder or doped silica glass powder, compressing the mold charged with the forming material from outside such as to form a porous glass body of the forming material around the rod-like member, removing the rod-like member from the porous glass body, inserting a glass rod into the hole formed after removal of the rod-like member, purifying said porous glass body in which the glass rod is inserted, and consolidating said porous glass body purified in the above purifying step.

17 Claims, 3 Drawing Sheets

METHOD OF MANUFACTURING A SILICA GLASS PREFORM

BACKGROUND OF THE INVENTION

1. Field of the Invention

The present invention relates to a method of manufacturing a silica glass preform of an optical fiber, a light guide, an image fiber, a rod lens, or the like, used in the field of telecommunications or optics.

2. Description of the Related Art

Conventionally, it is known that a silica glass preform of an optical fiber or a light guide used in the field of telecommunications or optics is fabricated by a rod in tube method.

According to the rod-in-tube method, a glass rod serving as a core is inserted to another glass tube used for cladding, and they are heated by heating means such that they are melted into an integral body, thereby forming a silica glass preform. However, this method entails a problem caused by bubbles remaining in the produced preform, which are created due to incomplete crushing of the interface between the glass rod and tube caused during the melting thereof by heating.

As pointed out in general, an optical fiber manufactured from the preform containing bubbles and subjected to heating and drawing, is of a low quality, and accordingly of a low reliability. Especially, such an optical fiber has the problem of low mechanical strength of the optical fiber produced.

As an alternative to the rod-in-tube method, there is proposed a method in which a porous glass body for cladding is formed on the outer circumference of a core glass rod using an isostatic pressing technique, and the produced porous glass preform is dehydrated and consolidated into a silica glass preform (Published Unexamined Japanese Patent Application (PUJPA) No. 61-256937).

The above method when carried out in reality proceeds in the following manner. First, a glass rod serving as a core is inserted into a flexible mold, and the remaining space is filled with silica glass powder as a forming material. Then, the filled mold is compressed from outside by means of a hydrostatic pressure to form a porous glass body on the outer circumference of the glass rod.

Thereafter, the porous glass body thus prepared is removed from the mold, and subjected to a series of process including dehydrating and consolidating to be formed into an optical fiber preform.

In the above-mentioned method, about 0.1 to 0.7 ton/$cm^2$, for example, of compressing pressure is applied to the mold on the outer surface toward its central axis for about 5 to 40 minutes. In some cases, the glass rod located in the center of the mold, breaks due to the pressure applied. The smaller the outer diameter of the glass rod, the higher the possibility of breakage of the rod. Further, when the glass rod is broken, the molded porous glass body also cracks due to the shock caused by breakage of the glass rod.

As a result, with the isostatic pressing method when employed for manufacturing a porous glass body around an glass rod, there always exists the problem of a low product yield.

SUMMARY OF THE INVENTION

The present invention has been proposed in consideration of the above problem, and the object thereof is to provide a method of fabricating a silica glass preform at a high yield, which can be actually achieved by preventing damage to a glass rod and a porous glass body when forming the porous glass body around the glass rod using the isostatic pressing method.

According to the present invention, there is provided a method of manufacturing a silica glass preform comprising the steps of: inserting a rod-like member mainly containing a ductile material, into a forming space of a mold; charging a remaining space in the mold with a forming material containing silica glass powder or doped silica glass powder compressing the mold charged with the forming material from outside to form a porous glass body of the forming material around the rod-like member; removing the rod-like member from the porous glass body thereby forming a hole after removal of the rod-like member; inserting a glass rod into the hole; purifying said porous glass body in which the glass rod is inserted, and consolidating said porous glass body purified in the above purifying step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will now be described in detail with reference to accompanying drawings.

Figure 1:
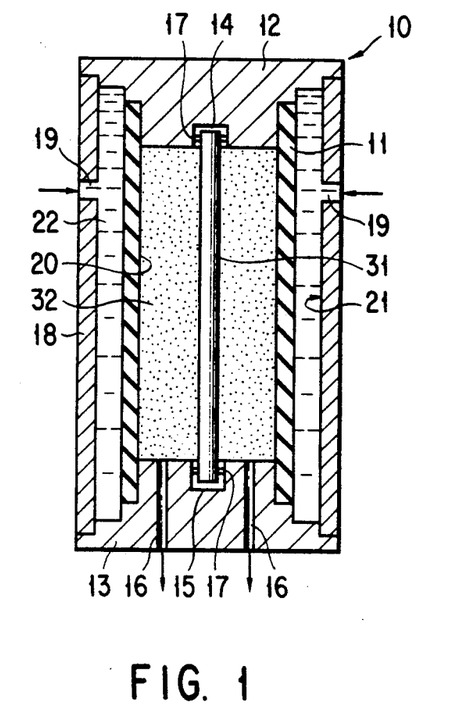
FIG. 1 is a cross section of the main sectional view of a forming apparatus used for practicing a method according to the present invention.

FIG. 1 is a cross sectional view of the main portion of a forming apparatus used for practicing an embodiment according to the invention. The forming apparatus used has a forming mold 11, a supporting cylinder 18 provided around the forming mold 11, and a pair of covers 12 and 13 for covering both openings of the mold. These elements are assembled into an assembly body 10.

In the assembly body 10, the forming mold 11 and the covers 12 and 13 constitute an actual mold, and the section enclosed by these members forms a forming space 20. Meanwhile, the section defined between the supporting cylinder 18 and the forming mold 11 forms a compression space 21.

Each of the covers 12 and 13 has stepped portions each fit to each of the forming mold 11 and the supporting cylinder 18. Further, recesses 14 and 15 are formed on the covers 12 and 13, respectively, at the center of the top step portion. Into the recesses 14 and 15, both ends of a rod like member 31, explained later, are respectively fit, and they are respectively fixed onto the covers 12 and 13 by means of jigs 17. In some cases, the cover 13 has a number of suction holes 16 made through the cover from the outer surface thereof to the inner surface, in accordance with necessity, and a vacuum pump (not shown) is connected to each of these suction holes, if any. Further, in some cases, a filter is provided for each of the suction holes 16.

The supporting cylinder 18 has a number of inlet/outlet openings 19 through which a compression medium is supplied into or discharged from the compression space 21.

Before forming, the assembly body 10 is placed in a compressing apparatus (not shown), and when the compression medium 22 is input to the compressing apparatus from the compression supplier not shown, the compression medium 22 is supplied to the compression space 21 from the outside of the supporting cylinder 18 through the inlet/outlet openings 19. Some of the examples used for the compressing medium 22 are water and lubricating oil.

The forming mold 11 is made of an elastic material such as natural rubber, silicon rubber, urethane rubber or nitril rubber, and the covers 12 and 13, and the supporting cylinder 18 are made of a metal such as aluminum. The supporting jig 17 is made of an elastic material, for example, rubber. The inner surface of each of the covers 12 and 13, which is actually brought into contact with the forming material, should preferably be coated with, for example, a fluorine resin (known as the trade name of teflon), in order to prevent contamination of the formed body, i.e., the porous glass body.

The rod-like member 31 is formed by mainly ductile material, for example, a metal. It may be formed by metal coated with glass or synthetic resin on the surface thereof. In essence, the material for the rod-like member 31 can be any as long as it has such a high ductility that it does not break due to a compression force during isostatic pressing, and such a strength that it is not easily deformed. The rod-like member 31 also should preferably be coated with glass, synthetic resin, especially fluorine resin, as mentioned above, to prevent contamination of the porous glass body.

Figure 2:
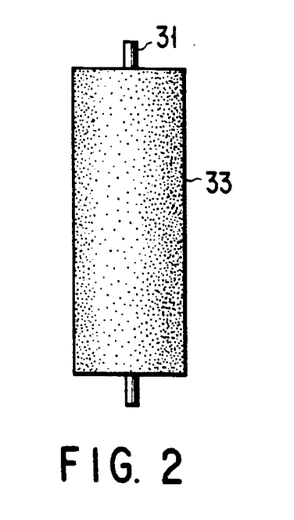
FIG. 2 is a diagram showing a stage in the method, in which a porous glass body is formed around the rod-like member.

With the rod-like member 31 set in the forming space 20, the forming material 32 is charged into the space 20. Then, the pressure is applied to the forming mold 11 via the compression medium 22 contained in the compression space 21. Accordingly, the porous glass body 33 is formed around the rod-like member 31, as shown in FIG. 2.

The forming material, which is formed into a porous glass body 33, contains silica glass powder, or doped silica glass powder which may be, for example, fine-particle powder containing a dopant and silica glass. Here, some of the examples of the dopant are $GeO_2$, $P_2O_5$, $B_2O_3$, or F.

The forming material 32 may consist solely of silica glass powder, or of silica glass powder containing a solvent or forming additive. An example of the solvent is pure water, and some of the examples of the forming additives are organic compounds such as polyvinyl alcohol, polyvinylbutylal, polyethylene glycol, methyl cellulose, carboxymethyl cellulose, ethyl cellulose, hydroxypropyl cellulose, and glycerine. The amount of addition of these forming additive is 1 to 20 wt% with respect to glass powder, and preferably 15 wt% or less.

The diameters of the particles of the silica glass powder usually fall in the range between 0.01 $\mu$m to 100 $\mu$m. The average of the diameters should preferably be in the range between 0.4 $\mu$m and 25 $\mu$m. This is because it is difficult to carry out removal of impurities in the purification step, later performed, if the diameters of the particles are smaller than 0.4 $\mu$m. Since a formed material made of the particles having the diameters of 0.4 $\mu$m or less has pores having small diameters, it should be difficult for a gas used in the purification step such as $Cl_2$, or substances to be removed in the step such as HCL, $FeCl_3$, $CuCl_2$, NaCl, and the like, to pass through the pores. On the other hand, if the average diameter of the particles is 25 $\mu$m or more, the adhesive force acting between the particles becomes so small that the formed body is likely to break due to the low solidity thereof.

Meanwhile, in the case where the forming space 20 cannot be uniformly filled with the silica glass powder, which occurs when the powder is of extremely fine particles, the formed porous glass body is likely to crack, break, change in size, and have a too widely distributed density of the porous glass body, due to the ununiformity of the packing density. Further, bubbles remain in the glass even after consolidation of the porous glass body. To prevent this, the extremely fine particle should be granulated to have the grain diameters of 30 $\mu$m or more using a solvent such as pure water, or a solvent and forming additive. Thus, the forming space can be filled uniformly at a high density with the powder thus granulated, and the above problem can be solved.

In order to practically carry out the above solution to the problem, it is preferable that the ratio of the granulated powder having grains diameters of 30 $\mu$m or more and 300 $\mu$m or less, is not less than 50% of all, and the ratio of the powder having grain diameters of 10 $\mu$m or less, is not more than 10% and not less than 1% of all. By use of the silica glass powder or doped silica glass powder having the mentioned grain diameter distribution, the ununiformity of the density of the filling powder can be further suppressed. Further, when the powder having such a distribution is compressed, fine particles are brought between large grains of granulated powder, combining the large grains with each other. Therefore, crack of the porous glass body formed is less likely to occur.

The silica glass powder should preferably be of one prepared by gas phase methods such as flame hydrolysis of silicon tetrachloride, and high-temperature oxidation of silicon or silicon tetrachloride, or one obtained from processing the powder prepared as above to increase the diameters of the particles. Further, those obtained from granulating the silica particles mentioned above are preferable. These silica glass powders have high purities, and consist of particles having substantially spherical shapes; therefore these powders will form formed body which can be easily purified in the purification step, carried out later. Another example of the silica glass powder is one originated from water glass, or granulated powder thereof. The silica glass powder originated from the water glass is charged into the forming space 20 with high charging property, and therefore crack of a porous glass body 33 molded is rare. Meanwhile, the silica glass powder obtained from the water glass has a number of silanol radicals (OH radicals) on the surface of each grain, and can be easily granulated without using a binder. Further, easy crashing property of the granulated grains can be controlled, and thus manufacture of a large-sized formed body becomes easy to achieve. The silica glass powder originated from the water glass can be used singly or in combination with some silica powder obtained by other preparation method (for example, chemical vapor deposition (CVD) method).

In the present invention, the porous glass body 33 should be made into a tube-like form, and both ends thereof should preferably be tapered (into a conical shape) or formed into a three-dimensional curved surface having a radius of curvature equal to or greater than the outside diameter of the porous glass body. Due to the structure mentioned above, the following advantages can be obtained.

(1) Since the end (edge) portions are formed into a conical shape or a three-dimensional curved surface, damage to the end portions of the porous glass body, which is likely to occur when the porous glass body is taken out from the mold after compression-forming of the porous glass body can be prevented, and thus cracking of the porous glass body can be significantly suppressed.

(2) Since an optical fiber preform is fabricated from the porous glass body having the conically-shaped or three-dimensionally curved end portions, consolidation of the porous glass body proceeds from a end which is inserted to a high-temperature furnace to be consolidated. This prevents generation of bubbles in the center portion of the optical fiber preform, and therefore a uniform and clear transparent glass can be obtained.

(3) When the preform is subjected to drawing after the consolidation and formed into an optical fiber, a supporting rod or the like, as it is, can be fused directly to the optical fiber, thereby saving the process time, and increasing the yield of the products.

The above described shaping may be carried out onto only one of the ends for a certain effect.

Figure 4:
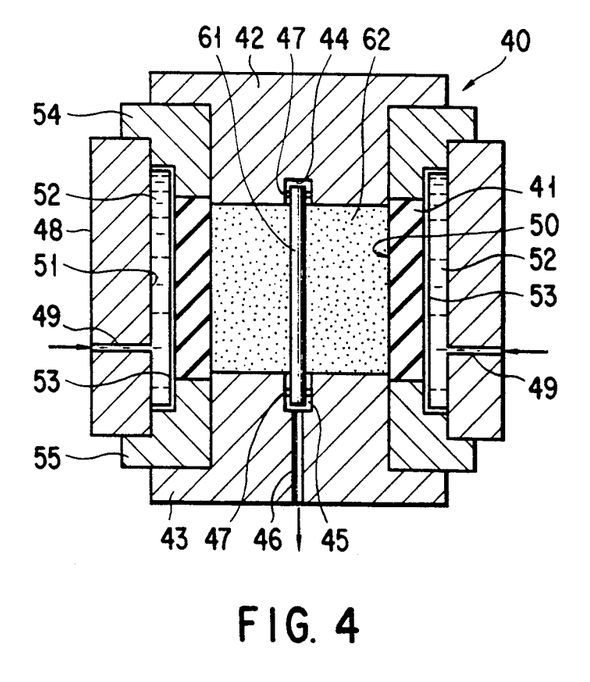
FIG. 4 is a cross sectional view of the main section of another forming apparatus which can be used for practicing the method according to the invention.
Figure 5A:
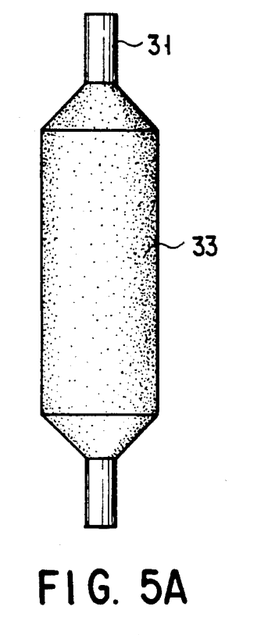
FIGS. 5A and 5B are side views each showing a porous glass body according to another embodiment.
Figure 5B:
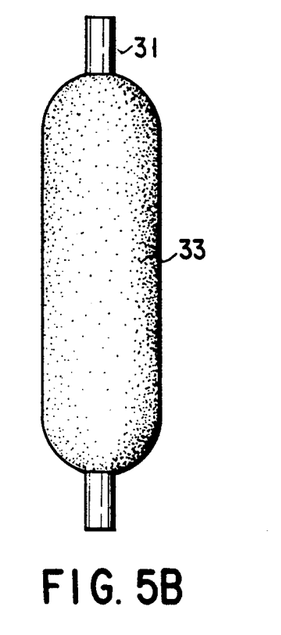
Figure 6:
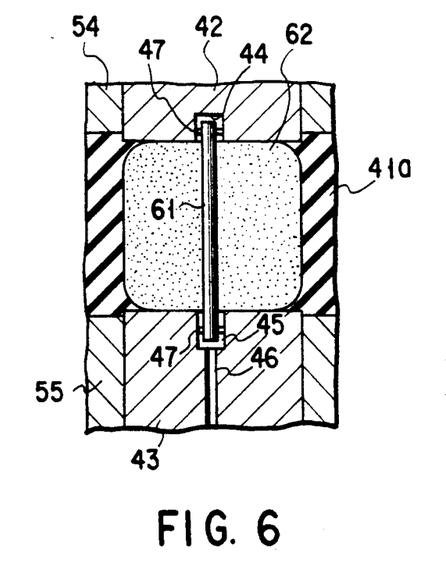
FIG. 6 is a cross sectional view of a forming apparatus for forming a porous glass body having a shape shown in FIG. 5B.
Figure 7:
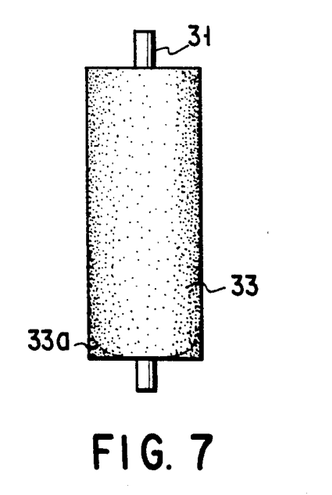
FIG. 7 is a side view of a porous glass body, for explaining another method of manufacturing a porous glass body having a shape shown in FIG. 5B.

The porous glass body can be formed into the above-described shape by use of a compressing device shown in FIG. 6, in which a forming mold 41a having an inner shape corresponding to a desired form, is employed in the device shown in FIG. 4, or by cutting an end portion 33a into a desired form as shown in FIG. 7 after forming.

In consideration, the easy charging of the forming space 20 with forming material 32 and easy forming of the forming material 32, the forming material 32 is preferably moisturized before charged into the forming space 20. Moisturizing of the forming material 32 increases the bulk density of the formed porous glass body 33, and at the same time, suppresses air absorption of the porous glass body 33. Thus, creation of bubbles in the silica glass preform can be prevented. In the meantime, moisturizing of the granulated powder, used as a forming material 32, can make the powder easily crash during the forming, and therefore the porous silica glass preform having a uniform density can be fabricated. In this case, moisture of the forming material is equal to or more than 1 wt% and less than 5 wt%.

Another technique for charging the forming space 20 with the forming material 32 with high charging property is removal of the static electricity from the forming material 32. Removal of the static electricity may be carried out either before charging the space 20 with the forming material 32, or while charging the space 20 with the material. At the same time, the forming mold 11, and the covers 12 and 13, which constitute a mold, should also be treated by the static electricity removing technique. Not only the forming material 32 and the mold, but also the surroundings of the material charging operation should be treated by the static electricity removing technique.

Removal of the static electricity can be performed by use of a static electricity remover commercially available. The static electricity remover ionize a gas by a high voltage, and disperse the ionized gas around an object, or spray the ionized gas onto the object, to remove the static electricity of the object.

With the static electricity removing treatment, unnecessary attraction or repelling acting between material particles themselves, and between the material and the mold due to static electricity, can be prevented, and therefore the packing density of the forming material 32 is uniformed.

Figure 3A:
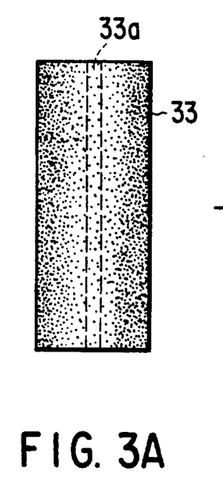
FIG. 3A is a diagram showing a stage in the method, in which the rod-like member is removed from the porous glass body.

Using the forming material 32 described above, a porous glass body 33 is formed around the rod-like member 31. After that, the rod-like member 31 is pulled out from the porous glass body 33, and this a hole 33a is formed as can be seen in FIG. 3A. Pulling-out of the rod-like member may be conducted while holding the porous glass body 33 in the mold, or after removing the glass body 33 from the mold.

Figure 3B:
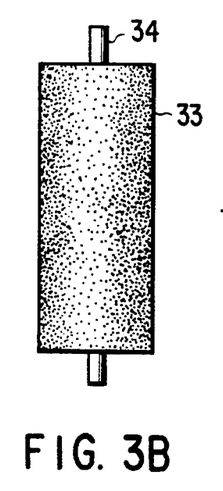
FIG. 3B is a diagram showing a stage in the method, in which a glass rod is inserted into the hole formed after removal of the rod-like member.

Then, into the hole 33a formed in the porous glass body 34, a glass rod 34 is inserted, as shown in FIG. 3B.

A glass rod 34 can be prepared by CVD method such as MCVD VAD, OVD and also purifying and consolidating a silica porous glass member made by the extrusion forming method, the MSP (mechanical shaped process) method, the press forming method, the slip casting method, the solgel method, the slip coating method, the method using powders, or the like. The glass rod 34 may be formed solely of a core glass, or a core glass having a part of a cladding glass therearound.

Figure 3C:
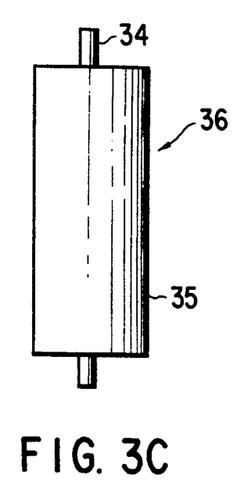
FIG. 3C is a diagram showing a silica glass preform after consolidation of the porous glass body.

After the glass rod 34 is inserted into the hole, the porous glass body 33 is purified by a known method, and then consolidated. The purification is carried out usually in an atmosphere containing $Cl_2$; however in the case where some organic compounds such as a forming additive has been added to the forming material, there is employed another purification, i.e., degreasing, wherein the organic compounds are decomposed by heat, and if needed, oxidized. In the purification in an atmosphere containing $Cl_2$, the purification is carried out at, for example, 1250° C. in an atmosphere of $Cl_2$ and He, and in this step, removal of metal impurities such as Na, Ca, Fe, Cu, and the like, and dehydration (removal of OH-radical) are achieved. The consolidation is carried out in the He atmosphere at, for example 1600° C., and in this step, the porous glass body 33 is transformed into a transparent glass body 35, thereby completing a silica glass preform 36 consisting of the glass rod 34 and the transparent glass body 35. It should be pointed out that the purification and consolidation are, in some cases, carried out in one step. Further, in this embodiment, the purification and consolidation were performed after inserting the glass rod 34 into the hole made by pulling the rod-like member 31 from the porous glass body 33; however the order of this procedure is not limited to the mentioned one. For example, the replacement of the rod-like member 31 with the glass rod 34 can be carried out after the purification of the porous glass body 33. It would make no difference if the purification is conducted after the rod-like member 31 is removed from the body 33, and then the glass rod 34 is inserted to the hole.

According to the above-described method, damages are not created in the glass rod and the porous glass body during formation of the porous glass body around the glass rod by the isostatic pressing technique, and therefore silica glass preform can be fabricated at a high yield. Further, since the porous glass body is consolidated into a transparent glass while being adhered to the glass rod, bubbles are hardly created on the interface between the transparent glass rod thus formed and the glass rod.

Another example of the forming apparatus will now be described. FIG. 4 is a cross section of the main section of another forming apparatus which can be employed in the method according to the present invention. This forming apparatus comprises a forming mold 41, a supporting cylinder 48 provided such as to surround the forming mold 41, and a pair of forming punches 42 and 43 provided for both ends of these members. These elements are assembled into an assembly body 40.

The forming punches 42 and 43 have recesses 44 and 45, respectively, formed at the center portion of the inner surface of each. Each end of a rod-like member 61 is fit into each of the recesses 44 and 45, and is fixed to each of the forming punches 42 and 43 by means of a jigs 47. The forming punch 43 has, in some cases, a suction hole 46 formed therethrough from the inner surface to the outer surface, in accordance with necessity. In the case where there is a hole, the suction hole 46 has a filter (not shown) provided therein.

The forming mold 41, and the forming punches 42 and 43 constitute a mold, and the section enclosed by these elements is a forming space 50. Further, the section defined between the supporting cylinder 48 and the forming mold 41 is a compression space 51.

Covers 54 and 55 each having a two-stepped ring shape, are placed around the forming punches 42 and 43, respectively, and a pressure propagating mold 53 is provided for the section corresponding to the compression space 51 defined by the outer circumferential surface of the forming mold 41, and the inner surface of each of the covers 54 and 55.

The supporting cylinder 48 has a number of inlet/outlet openings 49 for supplying a compression medium 52 into the compression space 51 and discharging the medium therefrom.

The assembly body 40 is in practice placed in a compressing apparatus (not shown), and when the compression medium 52 is input to the compressing apparatus, the compression medium 52 is supplied to the compression space 51 from the outside of the supporting cylinder 48 through the inlet/outlet openings 49.

The forming mold 41 is made of an elastic material similar to that used for the before-mentioned forming mold 11, and the supporting jig 47 is made of an elastic material such as rubber, as in the case of the supporting jig 17 mentioned before. The other elements are made of a metal such as aluminum. Further, the forming punches 42 and 43, which are actually brought into contact with the forming material, should preferably be coated with, for example, a fluorine resin as in the case of the inner surface of each of the covers 12 and 13, so as to prevent contamination of the formed body, i.e., the porous glass formed.

In the meantime, the rod-like member 61 is prepared in a similar manner to that for the rod-like member 31. With the rod-like member 61 set in the forming space 50, the forming material 62 is supplied into the space 50. Then, the pressure is applied to the forming mold 41 via the compression medium 52 contained in the compression space 51. Accordingly, the porous glass body is formed around the rod-like member 61, as shown in FIG. 4.

The following steps are carried out in a similar manner to the before-described case.

In FIGS. 1 to 7, both ends of the rod-like member (for example, numeral 31 in FIG. 1) project out of the porous glass body (for example, numeral 33 in FIG. 2): however this structure is not essential to the invention. Though one of both ends should preferably project out of it, they do not have to always project out. With one of the ends projecting out, it is easy to open a hole at the center of the porous member.

EXAMPLES

Examples of the present invention will now be explained.

EXAMPLE 1

In this example, commercially-available silica powder having the average particle diameter of 20 $\mu$m was solely used as a forming material 32, and a porous glass body was formed by use of the forming apparatus shown in FIG. 1.

As a forming mold 11, a silicon-rubber-made one having the outer diameter of 60 mm, the inner diameter of 50 mm, and the length of 270 mm was used. A forming space 20, defined by the forming mold 11, and covers 12 and 13, was of the significant length (height) of 250 mm. The covers 12 and 13 employed were ones each having the inner surface coated with teflon (trade name).

A rod-like member 31 employed was made of steel coated with teflon, and had the outer diameter of 10.6 mm, and the length of 270 mm.

When supplying the forming material 32, the cover 12 was removed from the assembly body, and the rod-like member 31 was set into the forming space 20 such that the lower end thereof is fit into the recess 15. Then, about 420 g of the forming material 32 treated by the vacuum technique was supplied into the forming space 20, and the space was closed by the cover 12.

The forming space 20 was vacuumed by means of the vacuum pump (not shown) connected to the suction hole 16, in accordance with necessity, and at the same time, lubricant oil, serving as a compression medium 22, was injected to the compression space 21 from the compression medium supplying system (not shown) connected to the inlet/outlet openings 19. Thus, the forming mold 11 was compressed for about 1 minute at the pressure of 1000 kgt/cm$^2$.

Accordingly, in the forming space 20, a porous glass body 33 having a uniform bulk density was formed around the rod-like member 31, and no cracks were found in the resultant. Thus formed porous glass body 33, made of the forming material 32, had the outer diameter of about 42 mm, and the length of 250 mm in size.

Of course, no damage was created either on the rod-like member 31.

Next, the compression medium 22 was gradually discharged from the compression space 21 to the outside over a time period of about 30 minutes to restore the forming mold 11. After restoration of the forming mold 11, the cover 12 was removed, and the porous glass body 33 was taken out of the forming space 20 along with the rod-like member 31.

Then, as shown in FIG. 3A, the rod-like member 31 was pulled out from the porous glass body 33, and a silica glass rod 34 was inserted into the hole 33a formed as shown in FIG. 3B. This glass rod 34 had the diameter of 10.6 mm, and the length of 270 mm in size. Further, regarding the glass rod, the ratio between the outer diameter of the core glass against the outer diameter of the cladding glass was 1:4, and the relative refractive index difference $\Delta$ between the core glass and the cladding glass was 0.35%.

The porous glass body 33 with the glass rod 34 inserted therein was purified (removal of impurity and dehydration) in an atmosphere of $Cl_2$ and He at 1250° C., and then consolidated in the He atmosphere at 1600° C. Thus, the porous glass body 33 was clarified into a transparent glass body 35, and accordingly an optical fiber preform 36 consisting of the glass rod 34 and the transparent glass body 35 as shown in FIG. 3C was obtained.

The optical fiber preform 36 thus obtained had the outer diameter of 35 mm, and no bubbles were found at the interface between the glass rod 34 and the transparent glass body 35.

The optical fiber preform 36 was then subjected to an optical fiber drawing method, and thus a single-mode type optical fiber having the core diameter of about 10 μm and the outer diameter of 125 μm was manufactured. Immediately after the drawing process, the obtained optical fiber was coated with by a UV-hardening resin coating layer such that the outer diameter of the layer is 400 μm.

It was confirmed that the coated optical fiber thus obtained had the same performance as a single-mode optical fiber prepared mainly through the CVD method.

For the sake of comparison, another porous glass body was fabricated in a similar procedure to the above-described one, using a silica glass rod having the outer diameter of 8 mm, the outer diameter ratio between the core glass and the cladding glass of 1:3, and the designed value for the cut-off wavelength of 1.30 μm, as the rod-like member.

Regarding the example and the comparative example, the breakability of each rod-like member, and the crack occurrence rate in each porous glass body were examined, and the results were as follows:

Example

Breakability of Rod-like Member=0%

Crack Occurrence Rate of Porous Glass Member Body=10%

Comparative Example

Breakability of Rod-like Member=80%

Crack Occurrence Rate of Porous Glass Body=60%

As is clear from the above-listed results, in the example, the rod-like member was never broken, and the occurrence of cracks in the porous glass body was very rare, whereas in the comparative example, the breakability of the rod-like member was high, and accordingly the crack occurrence rate of the porous glass body was high.

EXAMPLE 2

In this example, a forming material 32 was prepared by granulating commercially-available silica powder having the particle diameter 0.7 μm. Granulating was performed by following procedure. First, the silica glass powder was added with pure water, thereby forming slurry. Next, the slurry was granulated by use of a spray dryer. No binder was added during the granulation, or no dispersant was added to the slurry before the granulation. The granulated powder of the forming material 32 prepared had the average grain diameter of about 50 μm, and the powder having the average diameter of 30 μm or more occupies not less than 50% of all. Further, the amount of the fine-grain powder having particle diameters of 1 μm or less was about 5% of all.

Using the forming material 32, and the same rod-like member as Example 1, a porous glass body 33 was formed around the rod-like member in a similar procedure to that of Example 1. The porous glass body 33 obtained had the outer diameter of about 42 mm, and the length of about 250 mm in size, as in the Example 1.

Of course, no damage was created in the rod-like member 31.

After that, the same glass rod 34 as that used in the Example 1 was inserted to the porous glass body 33, and then the porous glass body 33 was purified (removal of impurities and dehydration) in an atmosphere of $Cl_2$ and He at 1250° C. The porous glass body 33 thus purified was further subjected to consolidation in the He atmosphere at 1600° C. to be consolidated into a transparent glass body 35. Thus, an optical fiber preform 36 consisting of the glass rod 34 and the transparent glass body 35 as shown in FIG. 3C, was obtained. Here, no bubbles were found at the contact surface between the glass rod 34 and the transparent glass body 35.

The optical fiber preform 36 was subjected to the same procedure as in the Example 1 to obtain a coated optical fiber having the same shape as that of the Example 1.

The cut-off wavelength of the coated optical fiber thus obtained was 1.30 μm as designed.

For the sake of comparison, a product using fine-particle silica glass powder having the average particle diameter of about 8 μm solely as the forming material 32 (comparative example 1), and another product using silica glass powder having the average grain diameter of about 50 μm solely as the material 32 (comparative example 2) were also examined.

As regards the above example, and the comparative examples 1 and 2, the packing density of the silica glass powder contained in the forming space, and the variance of the packing density were measured. The results were as follows:

Example 2

Packing Density 0.88 g/cm³
Variance of Packing Density ±0.02

Comparative Example 1

Packing Density 1.12 g/cm³
Variance of Packing Density ±0.08

Comparative Example 2

Packing Density 0.81 g/cm³
Variance of Packing Density ±0.05

As is clear from the results above, it was confirmed that although the packing density of the example is lower than the Comparative Example 1, the variance of the packing density is extremely smaller than those of the Comparative Examples 1 and 2. It should be noted here that the packing density of the example was sufficiently good such that the product can be used in a practical situation.

In this example, commercially-available silica powder having the average particle diameter of 0.7 μm similar to the forming material 32 used in the Example 2 was used as a forming material 62, and the forming apparatus used was the type shown in FIG. 4. The silica glass powder was first made into a slurry-like material with pure water added thereto, and granulated by means of a spray dryer to obtain the forming material 62. No binder was added during the granulation, or no dispersant was added to the slurry before the granulation. The forming material 62 thus prepared contains about less than 9.5% of fine-grain powder having particle diameter of 1 μm or less, and the rest of the material is the powder having the average diameter of about 50 μm. In fact, more than 50% of the powder was of the gains having the average diameter of 30 μm or more.

As a forming mold 41, a silicon-rubber-made one having the outer diameter of 60 mm, the inner diameter of 50 mm, and the length of 600 mm was used. A forming space 50, defined by the forming mold 41, and forming punches 42 and 43, was of the significant length (height) of 480 mm. The forming punches 42 and 43 employed were ones each having the inner surface coated with teflon (trade name).

When supplying the forming material 62, the punch 42 was removed from the assembly body, and the rod-like member 61 was set into the forming space 50 such that the lower end thereof is fit into the recess 45. Then, about 810 g of the forming material 62 treated by the vacuum technique was supplied into the forming space 50, and the space was closed by the forming punch 42.

After that, by means of the vacuum pump (not shown) connected to the suction hole 46, the forming space 50 was vacuumed, in accordance with necessity, and at the same time, lubricant oil, serving as a compression medium 52, was injected to the compression space 51 from the compression medium supplying system (not shown) connected to the inlet/outlet openings 49. Thus, the forming mold 11 was compressed for about 1 minute at the pressure of 500 kgf/cm².

Accordingly, in the forming space 50, a porous glass body having a uniform bulk density was thus formed around the rod-like member 61, and no cracks were found in the resultant. Thus formed porous glass body 33, made of the forming material 62, had the outer diameter of about 42 mm, and the length of 480 mm in size.

Next, the compression medium 52 was gradually discharged from the compression space 51 to the outside over a time period of about 1 hour to restore the forming mold 41. After restoration of the forming mold 41, the forming punch 42 was removed, and the porous glass body was taken out of the forming space 50 along with the rod-like member 61.

Then, the rod-like member 61 was pulled out from the porous glass body, and a glass rod was inserted into the hole formed in the porous glass body. This glass rod had the diameter of 10.6 mm, and the length of 500 mm in size. Further, regarding the glass rod, the ratio between the outer diameter of the core glass against the outer diameter of the cladding glass was 1:4, and the relative refractive index difference Δ between the core glass and the cladding glass was 0.35%.

The porous glass body with the glass rod inserted therein was purified (removal of impurity and dehydration) in an atmosphere of $Cl_2$ and He at 1270° C., and then consolidated in the He atmosphere at 1630° C. Thus, the porous glass body was consolidated into a transparent glass body, and accordingly an optical fiber preform consisting of the glass rod and the transparent glass body was obtained. No bubbles were found to be remaining in the transparent glass body of the preform.

The optical fiber preform was then subjected to the same method as in Example 1 to obtain a coated optical fiber having a similar structure to that of the Example 1. This coated optical fiber had the cut-off wavelength of 1.28 μm as designed, and also had the same characteristic as an optical fiber manufactured mainly through the CVD method as regards the variance of the cut-off wavelength in the longitudinal direction.

It should be noted here that the packing density and the variance thereof were as good as those of the Example 2.

EXAMPLE 4

In this example, the forming apparatus shown in FIG. 4, and a forming material made by granulating silica glass powder originated from water glass were used. The average grain diameter of the primary particles of the silica glass powder (before the granulation) was about 0.5 μm, and the average grain diameter of the granulated powder was about 100 μm.

The forming procedure was basically the same as the Example 3 except that the above-mentioned powder was used as the forming material 62, the forming mold 41 was made of nitril rubber (NBR), and the forming pressure was 1000 kgf/cm².

The porous glass body thus obtained had no cracks, which are likely to be created due to the restoring force quickly generated in the forming mold 41.

Next, the porous glass body was purified and consolidated into a transparent glass body as in the Example 3.

Here, the transparent glass body made of the silica glass powder originated from the water glass, and the other transparent body made of the other silica glass powder humid silica (grained humid silica, or natural silica) were compared with each other as regards the packing density of the powder in the mold, the yields of the porous glass body, and the transparent glass body. The results were as shown in Table 1 below.

TABLE 1

| Material | Filling Density (g/cm³) | Yield (%) | |
|---|---|---|---|
| | | Porous Glass Body | Transparent Glass Body |
| Water Glass | 0.90 | 90 | 90 |
| Humid Silica | 0.40 | 40 | 70 |

TABLE 1-continued

| Material | Filling Density (g/cm³) | Yield (%) Porous Glass Body | Yield (%) Transparent Glass Body |
|---|---|---|---|
| Grained Natural Silica | 1.00 | 10 | 50 |

As is clear from the Table 1, the silica glass powder obtained from the water glass exhibited a high packing density, and the yield of the resultant at each stage, i.e. formation of the porous glass body and the transparent glass body, was also high. Thus, it was confirmed that the silica glass powder originated from the water glass has excellent characteristics in fabricating was 6%. The silica glass powder was granulated by use a silica glass preform.

EXAMPLE 5

In this example, the forming apparatus shown in FIG. 4, and silica glass powder originated from water glass were employed. This silica glass powder consisted of the particles having the average diameter of about 0.7 μm, and was made into a slurry-like by adding pure water thereto as a solvent. The density of the slurry of a spray dryer, and the average diameter of the grains formed was about 50 μm.

Then, this silica glass powder was formed as in the Example 4, into a porous glass body formed around the rod-like member 61. The rod-like member was pulled out of the porous glass body, and a glass rod prepared by the CVD method was inserted to thus formed hole. Regarding this glass rod, the outer diameter ratio between the core glass and the cladding glass was 1:4.

After that, the porous glass body was purified and consolidated into a transparent glass body as in the Example 3, and thus an optical fiber preform consisting of the glass rod and the transparent glass body was obtained. The optical fiber preform was subjected to a regular drawing technique to obtain an optical fiber. The optical fiber thus obtained had characteristics equivalent to those of the optical fiber prepared by the CVD method or the like.

EXAMPLE 6

In this example, the forming apparatus shown in FIG. 4, and as the forming material 62, the granulated silica powder which was granulated silica powder having the average particle diameter of about 0.7 μm were employed. The average grain diameter of the granulated powder was about 50 μm, and the moisture of the granulated powder was about 0.5%.

Thus granulated powder was moisturized in a vessel having constant temperature and humidity. The moisturizing was carried out under the condition that the temperature was fixed to 40° C., and the humidity was to 70%. Under the above-mentioned condition, the moisture of the granulated silica powder was raised up to 3%. The moisture was measured by an infrared moisture meter. It should be noted that if the moisture is raised to 5% or higher, a part of the granulated powder is transformed back to the primary particles, thereby lowering the charging property of the powder.

The forming mold 41 employed here had the inner diameter of 50 mm, and was made of nitril rubber. The significant length (height) of the forming space defined by the forming mold 41, and the forming punches 42 and 43 was about 250 mm.

By use of the above-mentioned items, a porous glass body was formed around the rod-like member 61 in basically the same manner as the Example 3 except for charging 420 g of the forming material 62 made of the moisturized granulated powder into the forming space 50, and setting the forming pressure to 1000 kgf/cm².

After that, the applied pressure was gradually reduced over a time period of 20 minutes to prevent cracks, which may occur due to the restoration force quickly working in the forming mold 41 when the pressure drops.

This example proceeded following the steps described above, and no cracks were found in the porous glass body thus obtained.

Then, the rod-like member was pulled out from the porous glass body, and into the hole formed, a glass rod was inserted. The glass rod employed had the outer diameter ratio between the core glass and the cladding glass of 1:4, the diameter of 10.6 mm, and the length of 270 mm.

The porous glass body was purified and consolidated as in the Example 3, and transformed into a transparent glass body. Thus, an optical fiber preform consisting of the glass rod and the transparent glass body was fabricated. The obtained optical fiber preform had no bubbles therein. The optical fiber preform was subjected to drawing to form an optical fiber. The optical fiber thus obtained had the equal performance to that of the optical fiber prepared by the CVD method or the like.

For the purpose of comparison, using granulated silica powder which was not treated by a moisturizing process, a comparative formed body was fabricated in the same manner. The formed body of example and that of the comparative example were compared with each other regarding the density and porosity. The results were as shown in Table 2 below.

TABLE 2

| | Density of Formed Material (g/cm³) | Porosity of Formed Material (%) |
|---|---|---|
| Moisturized | 1.30 | 43.8 |
| Not Moisturized | 1.23 | 46.3 |

As can be seen in the Table 2, it was confirmed that moisturizing of the formed material enhances the density thereof, and suppresses the porosity. Since the porosity of the formed material dropped as shown in the Table 2, the amount of air contained in the material is accordingly reduced, and therefore no bubbles were created in the transparent glass body.

Further, the forming mold 11 was compressed in the same manner as the Example 1. Reduction of the pressure was carried out gradually over a time period of about 30 minutes so that the forming mold 11 does not restore its normal form too quickly. After restoration of the forming mold 11, the cover 12 was removed and the porous glass body was taken out of the forming space 20 along with the rod-like member 31.

Thus, the porous glass body having no cracks was obtained.

Thereafter, the rod-like member was pulled out from the porous glass body, and to the hole formed, a glass rod was inserted. This glass rod employed was prepared by the VAD (vapor phase axial deposition) method, which is a type of the CVD method, and had the outer diameter ratio between the core glass and the cladding glass of 1:3, the diameter of 7.8 mm, and the length of 260 mm.

Then, the porous glass body thus obtained was purified and consolidated into a transparent glass body, as in the Example 1, and thus an optical fiber preform consisting of the glass rod and the transparent glass body was fabricated. The optical fiber preform obtained had the outer diameter of about 35 mm, and the length of 235 mm.

The optical fiber preform was subjected to drawing of a known method to be manufactured into an optical fiber. The cut-off wavelength of the optical fiber measured was 1.30 $\mu$m, as designed. Regarding the variance of the cut-off wavelength in the longitudinal direction of the optical fiber, the optical fiber obtained here had the same property as that of the optical fiber fabricated by a CVD method such as the VAD method.

In the meantime, the forming material treated by the static electricity removing technique was compared with that which is not treated thereby regarding the packing density of the material, the variance of the packing density, and the number of bubbles found in the transparent glass body. The results were as shown in Table 3 below.

TABLE 3

|  | Static Electric. Removed | Static Electric. Not Removed |
| --- | --- | --- |
| Filling Density (g/cm$^3$) | 0.95 | 0.90 |
| Range of Variance of Filling Density | ±0.05 | ±0.08 |
| Number of Bubbles Found in Body Transparent Glass | 10 | 30 |

As is clear from Table 3, it was confirmed that the static electricity removing process can enhance the packing density of the forming material. Thereby reducing the number of bubbles remaining in the transparent glass body or the resultant from this on.

EXAMPLE 7

In this example, a forming apparatus having the structure shown in FIG. 4 except that the device includes a forming mold 41a having upper and lower ends formed into three-dementional curvature surfaces as shown in FIG. 6, was employed. First, 1700 g of the granulated silica glass powder was charged into the forming space 50. The silica glass powder used here was prepared by dispersing silica particles having the average diameter of 8 $\mu$m (trade name: Exelica SE-8, Tokuyama Soda Co.) into water, and granulated into the grains having the average diameter of 150 $\mu$m by a spray dry technique. Before filling the powder into the forming space 50, a stenless rod 61 having the outer diameter of 14 mm and coated with teflon was placed at the center portion Then, 1500 kgf/cm$^2$ of pressure was applied onto the forming mold 41a via water serving as the compression medium 52, to form the silica powder 62 filled around the rod-like member 61. Compressing time was 1 to 5 minutes.

Thus, a porous glass body was formed around the rod-like member 61. The rod-like member was then pulled out of the glass body, and to the hole thus made, an optical fiber core glass rod (the outer diameter ratio between the core glass and cladding glass of 1:3, the diameter of 14 mm) was inserted. Accordingly, a porous glass body for an optical fiber preform, which has the equivalent shape to that shown in FIG. 5B, was obtained. After that, the glass body obtained was purified and consolidated as in the example 1, and a transparent optical fiber preform having the outer diameter of 70 mm was obtained. The optical fiber preform was then subjected to drawing to fabricate an optical fiber having core and cladding, which had characteristics equivalent to those of the optical fiber obtained by the VAD method, one of the CVD methods.

EXAMPLE 8

Optical fiber base materials were fabricated using the molding materials described below in place of that (1) Silica fine particles (trade name: Exelica SE-1, Tokuyama Soda Co.) having the average diameter of 0.3 $\mu$m were dispersed into water to form silica granulated powder having the average grain diameter of 150 $\mu$m. The obtained powder was fabricated into a transparent silica glass. It was confirmed that the transparent silica glass contained 5 ppm of Fe, and is not suitable for an optical fiber.

(2) Silica fine particles (trade name: Admafine SO-25R, Admatex Co.) having the average diameter of 0.6 $\mu$m were dispersed into water to form silica granulated powder having the average grain diameter of 150 $\mu$m. The obtained powder was fabricated into a high-purity silica glass. It was confirmed that the silica glass contained 50 ppb of Fe, and is suitable for an optical fiber.

(3) Silica fine particles (trade name: Elsil, Mitsubishi Metal Co.) having the average diameter of 29 $\mu$m were dispersed into water along with 3% of PVA, to form silica granulated powder having the average grain diameter of 150 $\mu$m. The obtained forming porous class body was mechanically weak, and was not suitable for an optical fiber preform.

In the above-described examples, formation of optical fiber preforms was mainly discussed as examples of the silica glass preform. However, needless to say, preforms of image fibers, light guides, or rod lenses can be fabricated in a similar manner to those of the described examples.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a silica glass preform comprising the steps of:
    inserting a rod-like member mainly containing a ductile material, into a forming space of a mold;
    charging a remaining space of the forming space with a forming material containing silica glass powder, or doped silica glass powder;
    compressing the mold charged with the forming material from outside such as to form a porous glass body of the forming material around the rod-like member;
    removing the rod-like member from the porous glass body thereby forming a hole after removal of the rod-like member;
    inserting a glass rod into the hole;

purifying said porous glass body in which the glass rod is inserted; and consolidating said porous glass body purified in the above purifying step.

2. The method according to claim 1, wherein said removing step is performed after said purifying step.

3. The method according to claim 1, wherein said purifying step is performed between said removing step and said inserting step.

4. The method according to claim 1, wherein said rod-like member is formed mainly of a metal.

5. The method according to claim 4, wherein said rod-like member is formed of a metal coated with glass or synthetic resin on a surface thereof.

6. The method according to claim 1, wherein said forming material is silica powder, particles of which have an average diameter between a range of 0.4 to 25 $\mu$m.

7. The method according to claim 6, wherein said forming material contains 50% or more of granulated powder, grains of which have grain diameters between 30 $\mu$m and 300 $\mu$m, said granulated powder prepared from said silica powder.

8. The method according to claim 7, wherein said forming material contains 50% or more of granulated powder formed of grains having diameters of 30 $\mu$m or larger and 300 $\mu$m or less, and 1% or more and less than 10% of powder formed of grains having diameter of 10 $\mu$m or smaller.

9. The method according to claim 1, wherein said silica glass powder or doped silica glass powder contains powder originated from water glass.

10. The method according to claim 1, further comprising the step of removing static electricity from said forming material.

11. The method according to claim 10, further comprising the step of removing static electricity from said mold.

12. The method according to claim 1, wherein said forming material is moisturized before being filled into the forming space.

13. A method according to claim 12, wherein moisture of said forming material is equal to or more than 1 wt% and less than 5 wt%.

14. The method according to claim 1, wherein at least one of ends of the porous glass body is tapered into a conical shape or formed into a three-dimensional curved surface having a radius of curvature equal to or greater than an outside diameter of the porous glass body.

15. The method according to claim 1, wherein silica powder prepared by a chemical vapor deposition method such as flame hydrolysis reaction, oxidation reaction, paralysis reaction technique, or one obtained by processing the silica powder prepared, was used as silica glass powder.

16. The method according to claim 1, wherein silica powder prepared by oxidation of metal silicate, or one obtained by processing the silica powder, was used as silica glass powder.

17. The method according to claim 1, wherein at least one end of said rod like member projects out of said porous glass body.

* * * * *